Oct. 22, 1963  DU WAYNE G. BLACK ETAL  3,107,819
GRAVIMETRIC CONVEYOR

Filed April 12, 1961  7 Sheets-Sheet 1

INVENTORS
DUWAYNE G. BLACK, NEVILLE C. MCKELVY
AND CARL R. GEORGE
BY William D. Carothers

THEIR ATTORNEY

Oct. 22, 1963  DU WAYNE G. BLACK ETAL  3,107,819
GRAVIMETRIC CONVEYOR
Filed April 12, 1961   7 Sheets-Sheet 2

INVENTORS
DUWAYNE G. BLACK, NEVILLE C. MCKELVY
AND CARL R. GEORGE
BY William D. Carothers
THEIR ATTORNEY Oct. 22, 1963　　　DU WAYNE G. BLACK ETAL　　　3,107,819
GRAVIMETRIC CONVEYOR
Filed April 12, 1961　　　　　　　　　　　　　　　7 Sheets-Sheet 3

INVENTORS
DUWAYNE G. BLACK, NEVILLE C. MCKELVY
AND CARL R. GEORGE
BY William D. Carothers
THEIR ATTORNEY Oct. 22, 1963   DU WAYNE G. BLACK ETAL   3,107,819
GRAVIMETRIC CONVEYOR Filed April 12, 1961   7 Sheets-Sheet 4

INVENTORS
DUWAYNE G. BLACK, NEVILLE C. MCKELVY
AND CARL R. GEORGE
BY
William D. Carothers
THEIR ATTORNEY Oct. 22, 1963  DU WAYNE G. BLACK ETAL  3,107,819
GRAVIMETRIC CONVEYOR
Filed April 12, 1961  7 Sheets-Sheet 5

INVENTORS
DUWAYNE G. BLACK, NEVILLE C. MCKELVY
AND CARL R. GEORGE
BY
William D. Carothers
THEIR ATTORNEY Oct. 22, 1963 DU WAYNE G. BLACK ETAL 3,107,819
GRAVIMETRIC CONVEYOR
Filed April 12, 1961 7 Sheets-Sheet 6
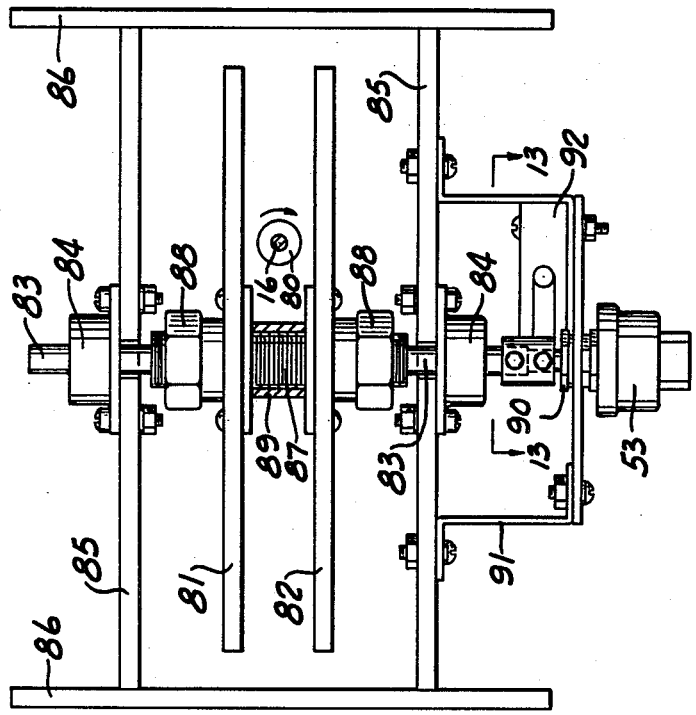
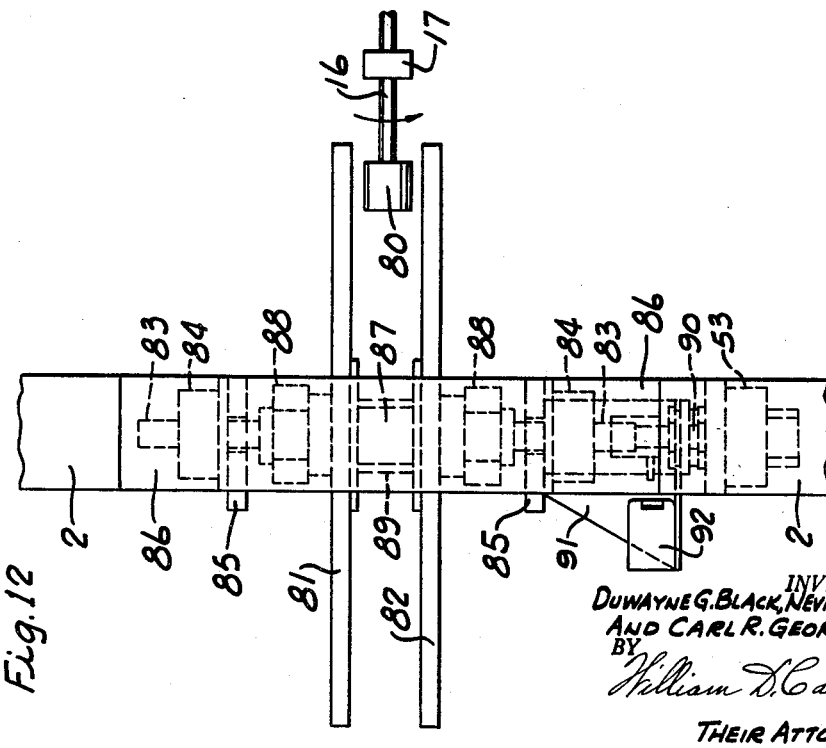
INVENTORS
DUWAYNE G. BLACK, NEVILLE C. MCKELVY
AND CARL R. GEORGE
BY
THEIR ATTORNEY Oct. 22, 1963 DU WAYNE G. BLACK ETAL 3,107,819
GRAVIMETRIC CONVEYOR
Filed April 12, 1961 7 Sheets-Sheet 7

INVENTORS
DuWAYNE G. BLACK, NEVILLE C. McKELVY
AND CARL R. GEORGE
BY
William D. Carothers
THEIR ATTORNEY

United States Patent Office 3,107,819
Patented Oct. 22, 1963

3,107,819
GRAVIMETRIC CONVEYOR
Du Wayne G. Black, Indiana, Neville C. McKelvy, Blairsville, and Carl R. George, Homer City, Pa., assignors, by mesne assignments, to Link-Belt Company, Chicago, Ill., a corporation of Illinois
Filed Apr. 12, 1961, Ser. No. 102,542
19 Claims. (Cl. 222—55)

This invention relates generally to gravimetric feeders and more particularly to a gravimetric feeder having a constant speed rotary feeder drum.

Present gravimetric feeders have synchronously driven endless belt conveyors which require special rollers supported on spaced shafts journaled in frictionless bearings. The shafts and belt are subjected to considerable wear and owing to the limited space and small diameter required of the rollers supporting this synchronously driven conveyor it is impossible to properly seal these parts which results in their frequent failure and need for replacement parts.

The principal object of this invention is the provision of a rotary drum conveyor mounted on a balanced frame for receiving the material, weighing the same and continuously passing it on to discharge. The drum conveyor when disposed with its rotary axis at right angles to the fulcrum of the frame does not interfere with the balancing operation of the frame. Again the drum conveyor is considerably larger than the synchronous belt conveyor and the bearing problem is substantially nil. The frame itself being merely a balanced frame may be supported on frictionless bearings which are materially less trouble and more practical than the knife edges used on the scale supporting the synchronous belt conveyor which require considerable adjustment. Thus the rotary drum gravimetric feeder is materially less expensive to build and it is more reliable owing to its rugged construction yet it has the sensitivity of the synchronous conveyor belt gravimetric feeder.

Another object is the provision of a novel means of controlling the supply to the constant speed rotating drum. The rotary driven shaft that carries the drum also actuates the control to change the rate of feed to the drum depending upon the under or overbalance of the frame due to the material carried on the constantly rotating drum. If the drum is overweight its rotary shaft operates the control to reduce the feed and if underweight the feed is lessened by this rotary shaft. This is materially simplified over the electronic magnetic pickup used on the synchronous belt gravimetric conveyors. This is accomplished by having an internal external friction drive disc on the shaft to operate stationary discs that rotate in opposite directions to change the rate of supply to the drum.

The supply to the drum may be a vibratory feeder, a vane controlled variable feeder, an iris valve, a hopper gate opening control, a variable speed screw feeder or a variable speed belt feeder. Any one of these suppliers could be regulated by the rotary shaft of the drum to control this gravimetric feeder.

Another object of this invention is the provision of a means to vary the balance of the frame or balance beam to control the weight and amount of material on the drum at any one time. This may be effected by running the poise back and forth on the beam or apply an expansible diaphragm to the balance of the beam which expansible diaphragm may be supplied with a variable pressure or having the diaphragm movable along the frame within a fixed pressure to vary the quantity fed. Several gravimetric feeders of this character may be independently adjustable to feed their separate ingredients to produce a mix. Each of these feeders being controlled by a fluid actuated expansible diaphragm control member and a common fluid pressure line supplying all of the control members, thus when all are properly set to feed their proportioned amount then the total amount of material may be changed while maintaining the same proportions by merely varying the common pressure supplied to all of the control members. Thus a central control is readily available to vary the total amount of all the ingredients supplied without changing the proportions.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a perspective view of the gravimetric conveyor comprising this invention.

FIG. 11 is an enlarged view in side elevation of a modified form of control.

FIG. 12 is a view in end elevation of FIG. 11.

Figure 1:
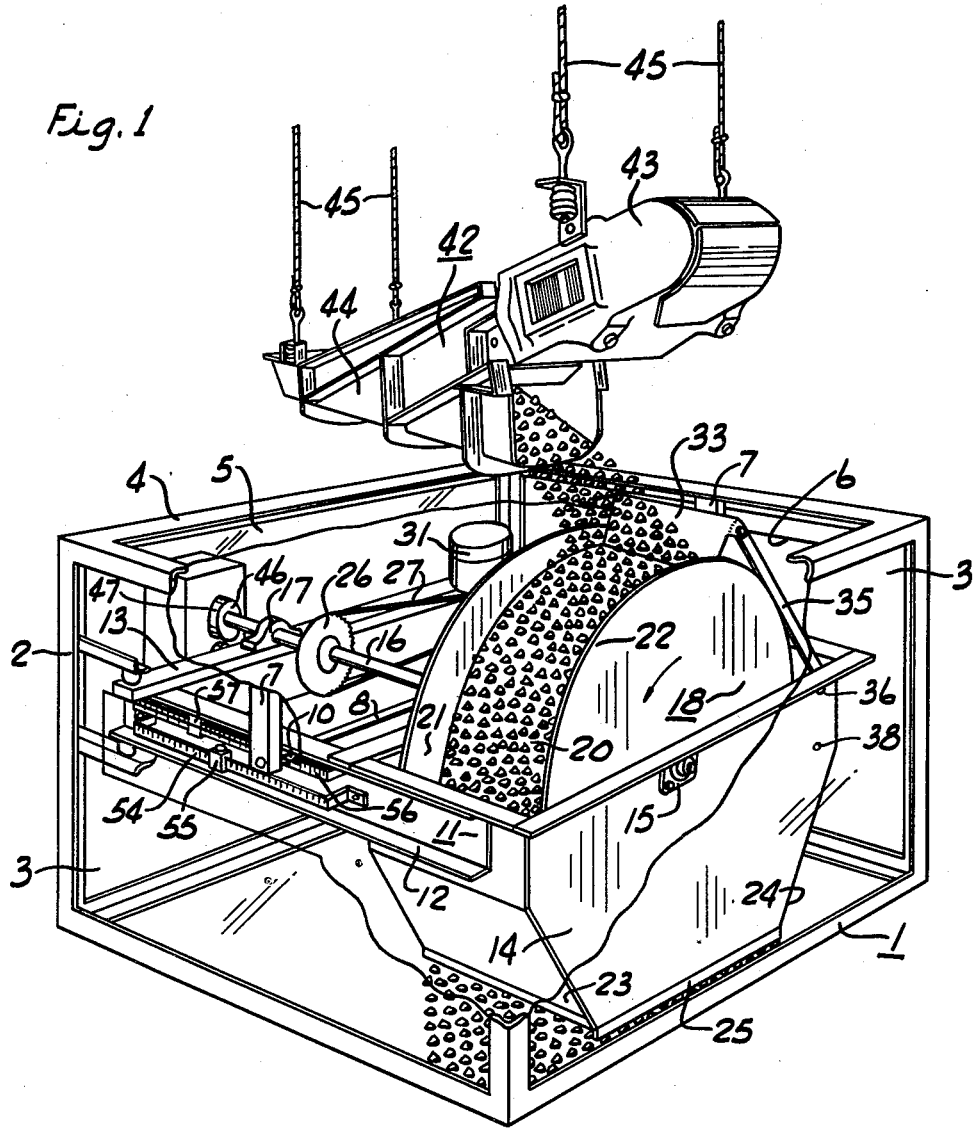
Figure 2:
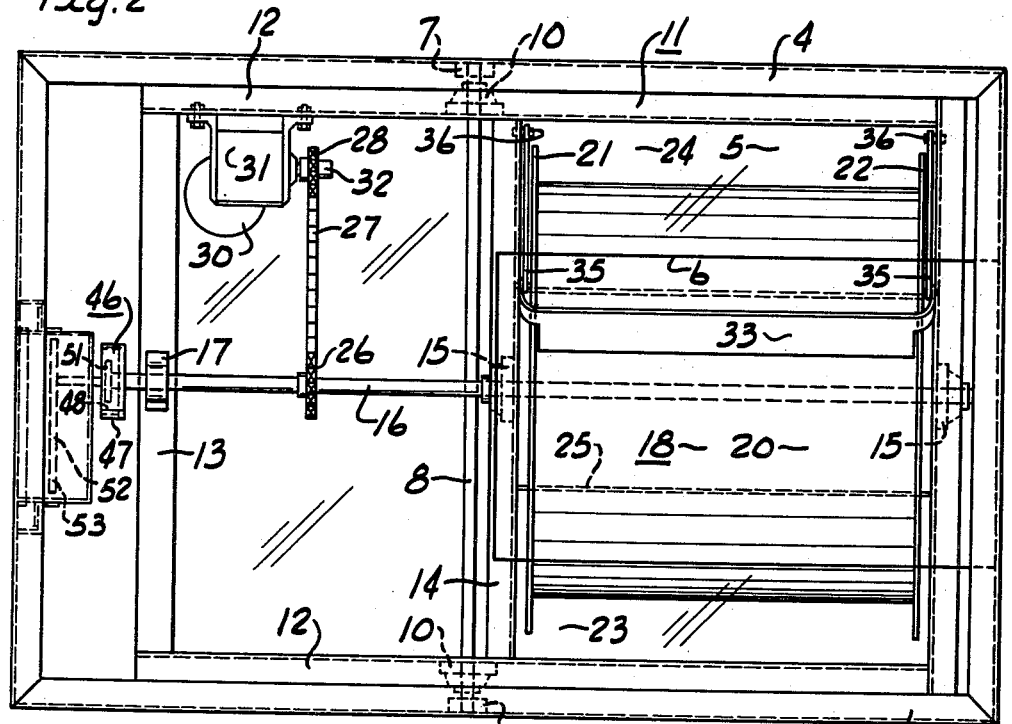
FIG. 2 is a plan view of the gravimetric conveyor without the supply feeder.

Referring to FIG. 1 the gravimetric feeder comprising this invention is supported on a base 1 in the form of a box constructed of the frame members 2 enclosed by the panels 3 made of glass or plastic to enable one to observe the operation of the gravimetric feeder. The top frame 4 has its panel 5 open as indicated at 6 to permit the material to be supplied thereto. This top frame 4 has oppositely disposed depending posts 7 which support the fulcrum 8 in the form of a shaft. This shaft extends through the bearings 10 carried on the opposite sides of the balance frame 11 which is a rectangular frame made of the side channel members 12, the end cross member 13 and a hopper 14 which carries the spaced aligned bearings 15 for rotatably supporting the shaft 16. A bearing 17 is also provided in the cross member 13 for carrying the opposite end of the shaft 16. The shaft 16 carries the constant speed rotary drum 18 having a smooth trough surface 20 with flanged sides 21 and 22. The drum 18 is fixed to the shaft 16 and runs free within the hopper 14. The lower end of the hopper 14 may be reduced as shown in FIG. 1 by the converging sides 23 and 24 which with the sides of the hopper 14 provide a discharge opening 25 at the lower end thereof.

The shaft 16 is provided with a sprocket gear 26 connected by the chain 27 to the driving sprocket 28 on the end of the shaft of the motor 30 which in turn is supported by the balance frame 11. The motor 30 may operate through a gear reduction 31 to rotate the shaft 32 on which the driving sprocket 28 is secured. The motor 30 is a constant speed motor. Thus the shaft 16 is rotated at a constant speed and the drum likewise continuously travels at a constant speed. This of course may be accomplished by employing a synchronous drive motor 30.

The weigh wheel 18 is provided with an upper and lower scraper 33 and 34. The scraper 33 is supported by the arm 35 pivoted within the hopper 14 as indicated at 36. The lower scraper 34 is also supported by the arm 37 pivoted within the hopper at 38 and held upwardly against the trough 20 of the weigh wheel by the spring 40 supported from the abutment 41 within the hopper 14. The scraping blades 33 and 34 substantially fill the trough 20 and thus insure a complete removal of the material at the bottom of the drum and preventing the material from flowing back down the drum from the top thereof. Thus the material when received on the weigh wheel flows with the wheel until the angle of repose is reached at which time the material falls off the end of the drum striking the converging side 23. From thence it flows to the discharge 25.

The material as fed to the weigh wheel as shown in FIG. 1 is supplied by the vibratory feeder 42 which is constructed of the motor member 43 supplying vibratory feeding movement to the trough member 44 all of which are suspended by the cable members 45 and a suitable continuous supply such as a hopper or belt feeder will deliver materials to the trough 44 of the feeder 42.

Figure 4:
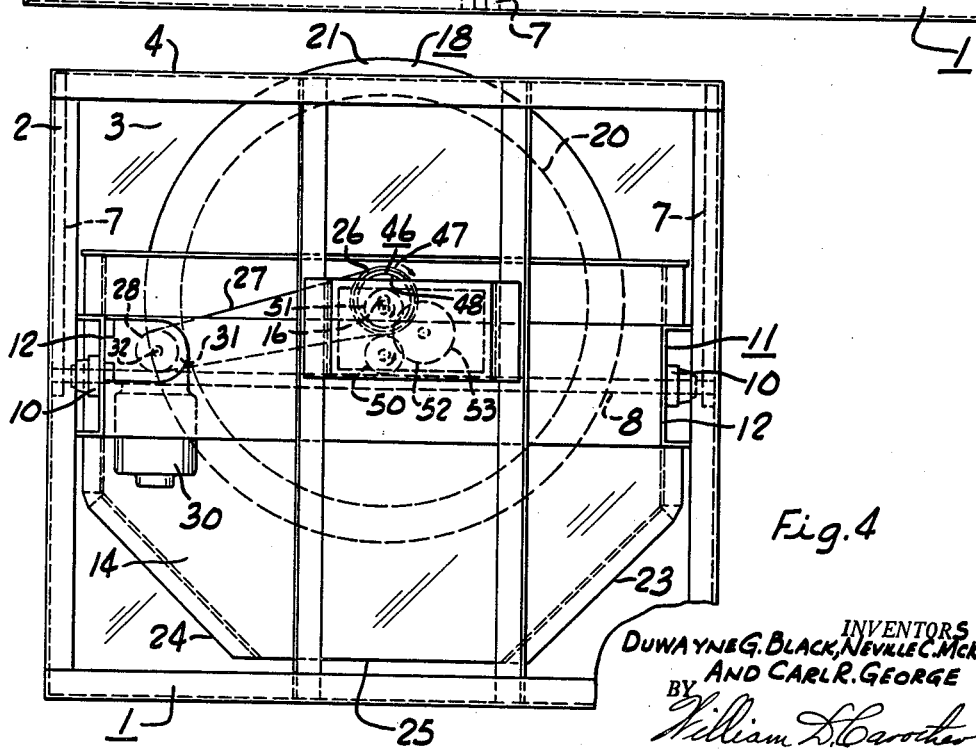
FIG. 4 is an end view showing the control of the gravimetric conveyor.
Figure 5:
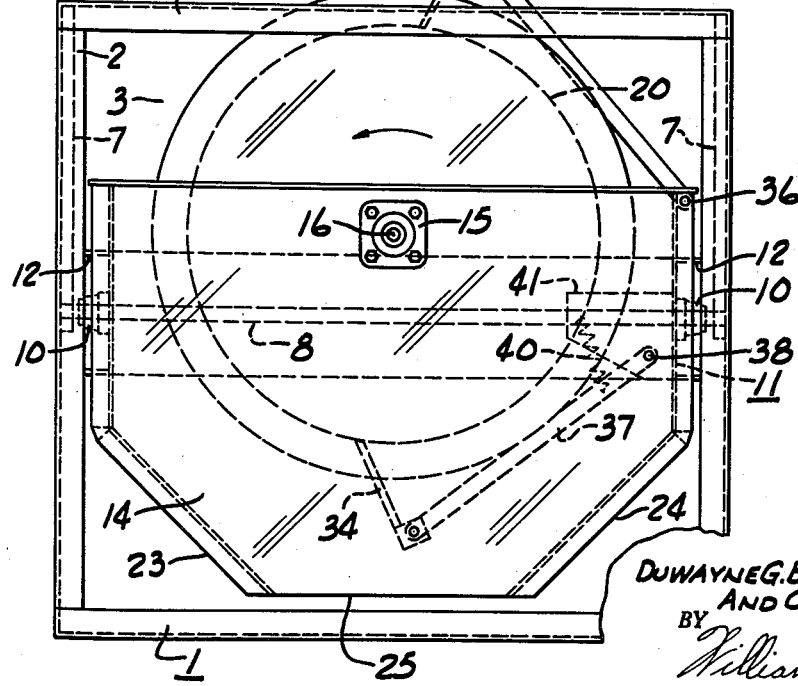
FIG. 5 is an opposite end view of the gravimetric conveyor.

The shaft 16 extends beyond the weigh frame 11 and is provided with a drive wheel or drum member 46 that has an external friction drive surface 47 and an internal frictional drive surface 48. Since the drum 46 is secured to the end of the shaft it of course is continuously rotating in a counterclockwise direction as shown in FIGS. 1 and 5 as indicated by the arrows. When the weigh frame 11 is under balanced the drum 46 has its outer perimetral frictional surface 47 engage the rubber disc 50 and rotate this disc in a counterclockwise direction as shown in FIG. 4 owing to the fact that the drum 46 is rotating in a clockwise direction in FIG. 4. If the material on the drum is such that it weighs more or overbalances the drum, then the drum 46 will raise due to this overbalance and the internal driving surface 48 will engage the disc member 51 and drive it in a clockwise direction as viewed in FIG. 4.

Both of the disc members 50 and 51 are in turn geared together and to the drive member 52 which is on a rheostat shaft to vary the resistance 53. Since the single drum 46 is spaced from the discs 50 and 51 it can only drive either disc alternately as it disengages one disc before it strikes the other. Thus the position of the weigh frame 11 determines in which direction the rheostat is rotated. Thus by changing the resistance through the rheostat 53 a feeder motor 43 may be varied to increase or decrease its feed of material to the weigh wheel 18. This simple mechanical drive provides a very inexpensive and positive means for controlling the operation of the feeder 42 and varying the load. If of course the feeder supplies material at a fairly constant rate to the weigh wheel 18 the balance frame 11 will not move on its fulcrum as the material fed is in accordance with the selected supply per unit of time.

Figure 3:
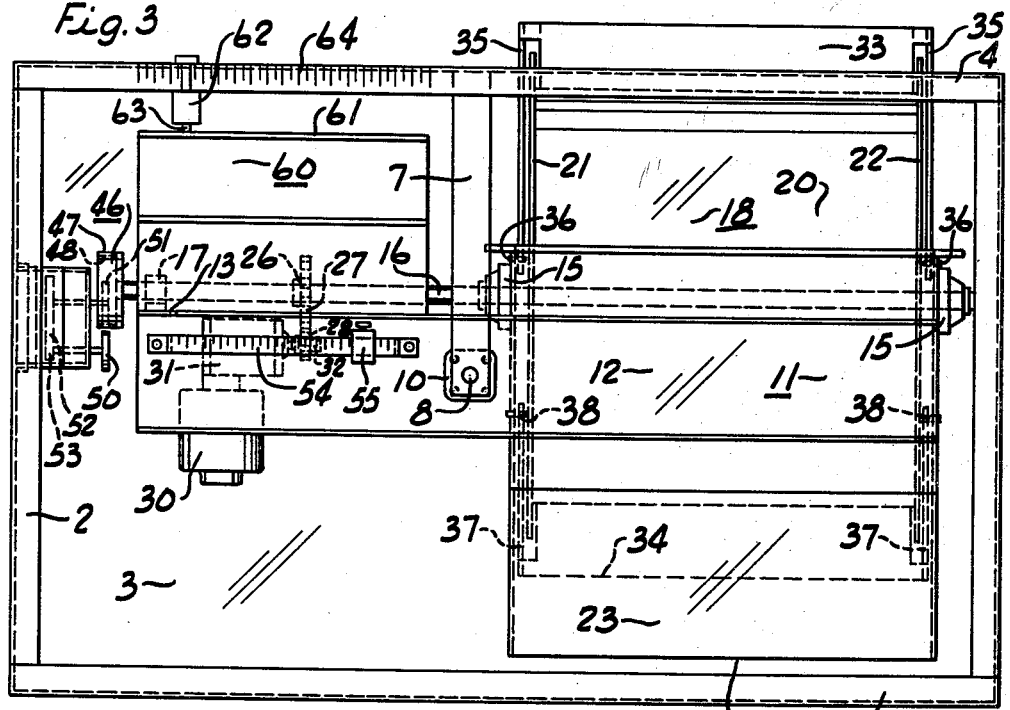
FIG. 3 is a view in side elevation of the structure shown in FIG. 2.

In view of the fact that the balance frame 11 is supported by antifriction bearings 10 which are sealed to maintain them as clean as possible the weighing structure is rugged and will not readily get out of adjustment. Then too, the manner of correcting the feed through the variable resistance or inductance or whatever electrical control is actuated by the discs 50 and 51. This device may hunt continuously at rapid rates or move very slowly when the material feeds uniformly. Different kinds of material of course create different conditions. However, the rugged construction of this gravimetric conveyor still provides a high degree of accuracy in fairly small as well as very heavy continuous feeding supply. As shown on FIGS. 1 and 3 the scale 54 is provided to support the tare weight poise 55 which poise is employed to balance the frame 11. The second scale 56 is provided with a poise 57 to determine the weight of the material to be supplied to the constant speed rotary weigh wheel 18. Thus by setting the poise 57 one may supply at a very high degree of accuracy a constant weight of material per period of time.

In place of the poise 57 the upper surface of the frame 11 is provided with a rail member 60 and this rail presents a smooth upper surface 61 against which an expansible diaphragm means 62 is effective. The expansible diaphragm means is provided with an engaging button 63 that actually contacts the surface 61. The device 62 may be of a bellows type which is expanded or contracted by the application of fluid under pressure such as a gas or liquid. This diaphragm expansion means 62 is supported and is adjustable along the frame 4 of the base 1 and this frame may be provided with a scale 64 which can be calibrated in weights of material supplied. If a constant pressure is supplied to the diaphragm expansion means then this device 62 may be adjusted along the frame 4 to be effective in varying the weight of the material to be continuously supplied at a constant rate. If on the other hand the diaphragm expansion means is positioned at one location then a variation in pressure of the fluid expanding the diaphragm will of course be effective on the rail 60 to change the quantity of material supplied at a constant rate. Thus by having a multiplicity of the gravimetric conveyors of the characters shown each having a diaphragm expansion means 62 properly located to continuously supply a specific amount of material and when all of these diaphragm expansion means are connected to the same pipeline representing the control fluid for operating these diaphragm expansion means the mere variation in pressure to this line will proportionately change the quantities in all of the gravimetric conveyors. Thus by a single fluid control one is enabled to change the total amount of the batch which may be supplied with ten different ingredients coming from ten different gravimetric conveyors of this character.

This type of control also lends to flexibility in other different types of applications. It is simple. It is rugged and effective and is less likely to become out of adjustment than the other type of gravimetric feeders known in the art.

Figure 6:
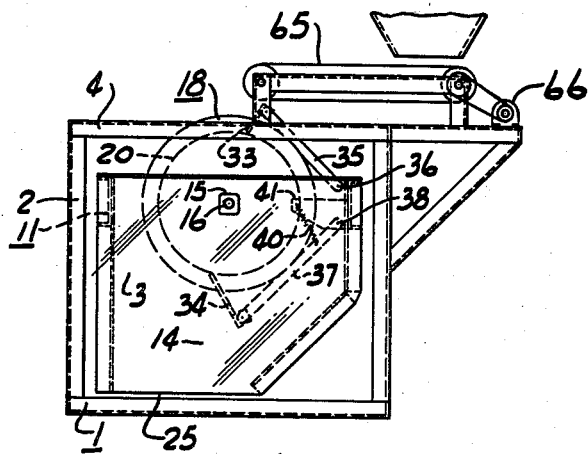
FIG. 6 is an end view of the gravimetric conveyor showing a supply belt feeder.

As shown in FIG. 6 the supply feeder 42 has been changed to a belt type feeder 65 which is driven by a variable speed motor 66 to effect the same result as that of the feeder 42.

Figure 7:
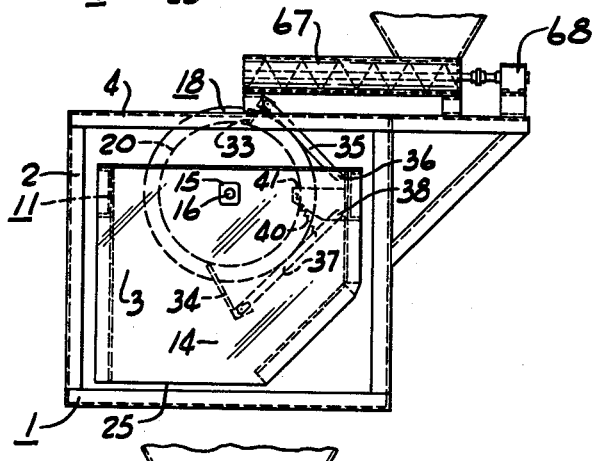
FIG. 7 is an end view of the gravimetric conveyor showing a screw type supply feeder.
Figure 8:
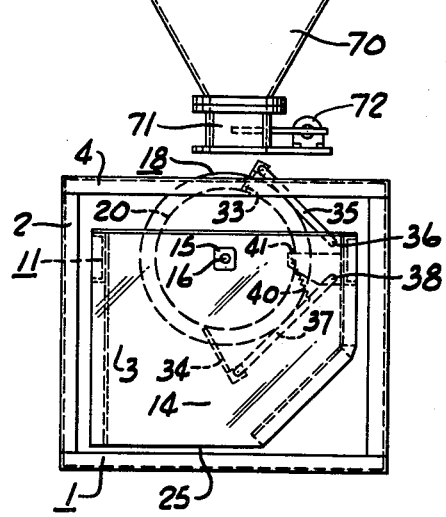
FIG. 8 is an end view of the gravimetric conveyor showing a supply feeder in the form of a hopper with a variable operated gate.
Figure 9:
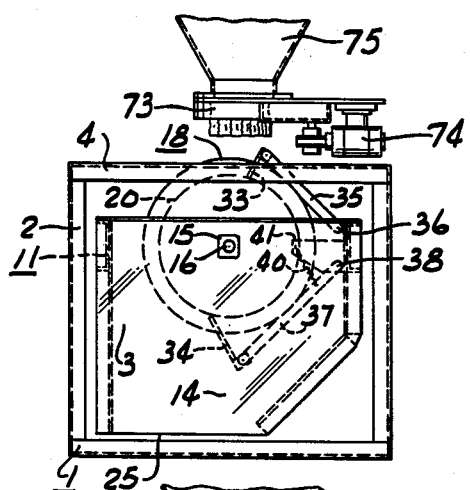
FIG. 9 is an end view of the gravimetric conveyor showing a supply feeder in the form of a remote controlled iris valve.
Figure 10:
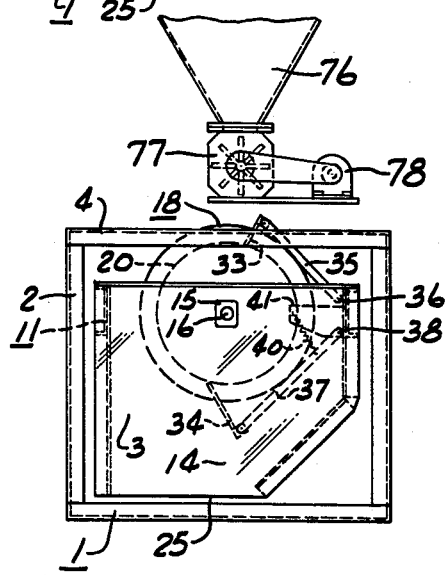
FIG. 10 is an end view of the gravimetric conveyor showing a supply feeder in the form of a hopper having a vane discharging material therefrom.

In a structure shown in FIG. 7 the supply feeder is a screw feeder 67 actuated by a variable speed motor 68 operated by the rheostat 53. In the structure shown in FIG. 8 the supply feeder is in the form of a hopper 70 having a gate member 71 open by the motor 72 controlled from the rheostat 53. In FIG. 9 the supply feeder is in the form of an iris valve 73 operated by a motor 74 which opens and closes the iris thereby controlling the flow of material from the hopper 75 in supplying this weigh conveyor. In FIG. 10 the hopper 76 is supplied with a vane feeder 77 operated by a motor 78 controlled by the resistance 53.

Thus in each instance the feeding means that supplies material to the gravimetric conveyor may be in a variety of different forms each of which is controlled by a similar means such as the rheostat 53.

Figure 13:
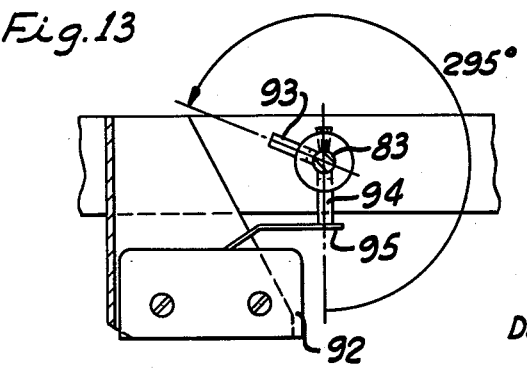
FIG. 13 is a sectional view taken on the line 13—13 of FIG. 11.

Referring now to FIGS. 11, 12 and 13 the rheostat 53 is actuated by the drum shaft 16 through a modified drive structure. In place of the drum 46 the shaft 16 is provided with a rubber wheel 80 that is sufficiently small to be held between the discs 81 and 82 mounted on the shaft 83 rotatably supported by the bearing 84 mounted on the horizontal straps 85 secured at their opposite ends to the vertical mounting strips 86 that are in turn secured to the frame 2.

The shaft 83 is threaded in its center portion at 87 to receive the nuts 88 that lock the discs 81 and 82 on the shaft which are spaced by the sleeve 89. Thus the discs 81 and 82 may be adjusted along the shaft 83 to properly space the discs on opposite sides of the rubber drive wheel 80 on the shaft 16. If the shaft 16 is traveling clockwise in FIG. 11 and the drum 18 is overloaded the shaft 16 will raise the driver 80, the top disk 81 and shaft 83 clockwise as viewed in FIG. 13. If on the other hand the drum 18 is lighter than it should be then the drive wheel 80 engages the disc 82 to rotate the shaft in a counterclockwise direction in FIG. 13. Thus the drive wheel 80 functions in a manner similar to that of the drum 46 and the discs 81 and 82 take the place of the wheels 51 and 50.

The shaft 83 is connected directly to the shaft 90 extending from the rheostat 53 and is rotated thereby. The rheostat has a rotary travel of about 300° and a bracket 91 supports the micro limit switch 92 that has a heel and a normally closed contact. The shaft 83 has the limit switch operators 93 and 94 that are spaced around the shaft 83 about 295° and at the ends of this stroke the operators engage the micro switch arm 95 to open the normally closed circuit and interrupt the same.

Figure 14:
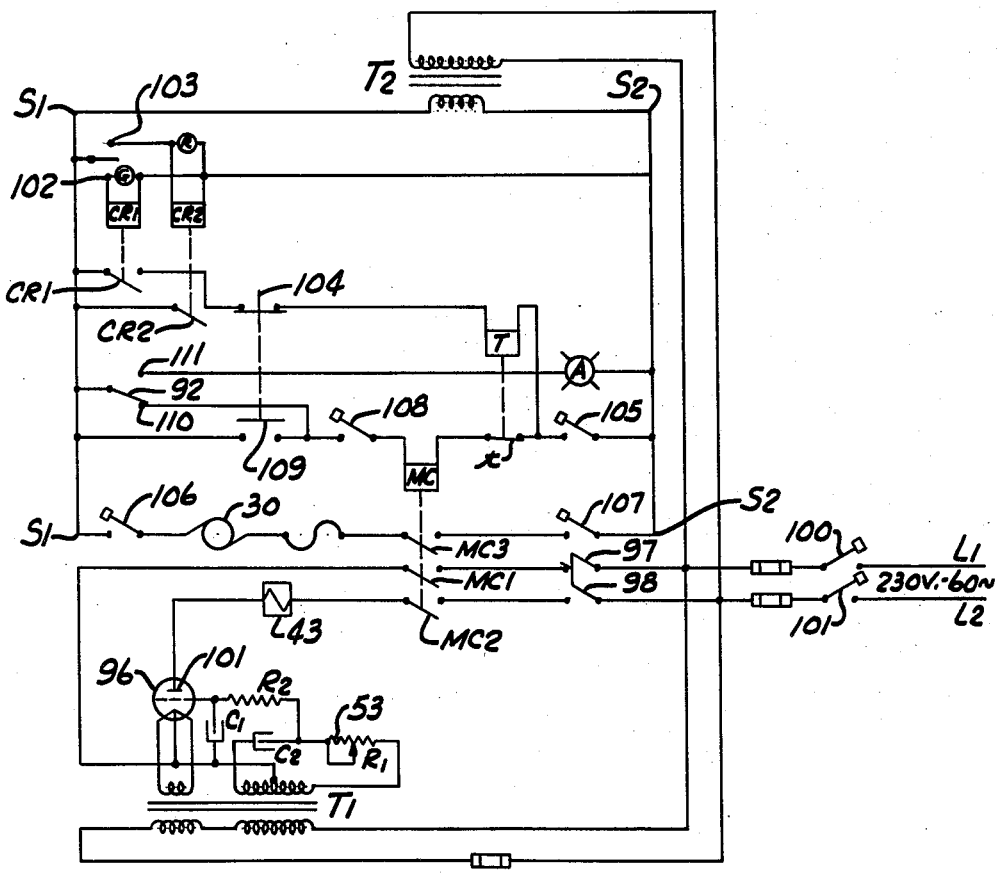
FIG. 14 is a circuit diagram of the gravimetric conveyor comprising this invention.

In the circuit diagram of FIG. 14 the feeder motor 43 is supplied by operating current from the grid controlled tube and the line sides are flanked by the double blade knife switch 97 and 98 and by the front or normally open contacts MC1 and MC2. Thus when the MC relay is closed and the knife switch blades 97 and 98 are closed, the current travels from one side of the 230 v. single phase sixty cycle line L1 to the main switch 100 to knife switch 97, contact MC1, the cathode and anode of 96, the electromagnetic motor 43, contact MC2, knife switch 98 to switch 101 and line L2. The grid 101 of the tube 96 is properly biased through the variable resistance 53 or R1, the fixed resistance R2 and the condensers C1 and C2 in the usual manner form the secondary of the transformer T1, the primary of which is connected across L1 and L2 and in series with the cathode winding.

The transformer T2 reduces the 230 volts to 115 volts, the secondary of which supplies the lines S1 and S2.

The first circuit between these supply lines is to CR1 relay which is supplied with current through the overweight contact 102 to one side of the green light G and one side of the CR1 relay, thence from both to line S2.

The second circuit is the counterpart, being that of the relay CR2 which is supplied with current through the underweight contact 103 to one side of the red light R and one side of the CR2 relay, thence from both to line S2.

The contacts 102 and 103 are actuated by the balanced frame 11 operating with respect to the frame 2. Under normal operation of the continuous weigh machine the over and under contacts 102 and 103 are not ordinarily engaged. When the drivers 46 or 80 engage their respective over and under drive discs the respective over and under weight contacts 102, 103 also close to energize their respective CR1, CR2 relays. When either of these relays is energized their contacts connect the line S1 to one side of the normally closed reset push button 104, the other side of which is connected to one side of the time delay in opening relay T, which is preferably adjustable up to sixty seconds, and thence to the switch blade 105 which if closed connects this circuit to line S2.

The motor 30 that rotates drum 18 is connected by the knife blades 106, 107 of a single switch to the lines S1 and S2 and a front or normally open contact MC3 is connected in series with this motor 30.

The MC relay has the normally closed timer contact *t* connected in series therewith and is isolated by the knife blades 105 and 108 of the single switch. The switch blade 108 is connected to S1 through the normally open reset push button 109 which is mechanically connected to 104. One normally closed contact 110 of the limit switch 92 connects the line S1 to the switch 108, thus shunting the push button contact 109. The other normally open limit switch contact 111 connects the line S1 to one side of the amber light A, the other side of which is connected to S2. Thus when the shaft 83 is driven to move either post 93 or 94, as shown in FIG. 13, to engage the arm 95, then the contact 111 closes to light the amber light and by the same token the contact 110 is opened to deenergize the MC relay and its contact MC3 opens the motor circuit 30 to stop the drum 18. The contacts MC1 and MC2 also interrupt the tube 96 and the feeder motor 43. The CR relay energized will start the timer T and if the MC relay circuit is not open within its time limit then the timer contact *t* opens the MC relay circuit.

This condition represents two phases, first, that the feeder and the drum are empty of the material to be fed, and secondly, that the material has flushed and is overloaded. Otherwise the device operates between the arm 93 and 94 swinging in the 295° arc. By changing the resistance 53 or R2 in the grid circuit the flow may be kept constant.

We claim:

1. A gravimetric conveyor consisting of a base, a balanced frame pivotally mounted on said base, a constant speed rotary driven shaft mounted on said frame, an annular conveyor drum continuously rotated by said shaft, feeding means to supply material to the top of said rotary conveyor drum which is fed therefrom by the rotation of said conveyor drum, control means for said feeding means to increase and decrease the supply of material flowing therefrom, and a rotary drive wheel mounted on and operated by said shaft and controlled by the oscillating movement of said balanced frame to operate said control means to decrease the flow of material from said feeding means if the weight of the material on said conveyor drum overbalances said frame and increase the flow of material from said feeding means if the weight of material on said conveyor drum under balances said frame.

2. The gravimetric conveyor of claim 1 characterized in that said rotary drive wheel is controlled by the oscillatory movement of said frame, said rotary wheel positioned to engage and drive said control means when said frame is out of balance.

3. The gravimetric conveyor of claim 2 characterized in that said control means includes spaced rotary discs each selectively and independently operated by said rotary wheel depending upon the state of underbalance and overbalance of said frame.

4. The gravimetric conveyor of claim 2 characterized in that said control means includes spaced rotary discs, said rotary wheel having an annular flange the inner and outer surfaces of which independently engage said rotary discs depending upon the state of underbalance and overbalance of said frame to operate said control means.

5. The gravimetric conveyor of claim 1 characterized in that said balanced frame includes a tare weight poise to balance the same.

6. The gravimetric conveyor of claim 1 characterized in that said balanced frame includes a weighing scale with a poise to regulate the weight of material to be carried by said rotating conveyor drum.

7. The gravimetric conveyor of claim 1 characterized in that said balanced frame includes a fluid actuated diaphragm expansion means carried by said base and operative to apply pressure on said frame to function in the manner of a poise weight and regulate the weight of material to be continuously carried by said rotating conveyor drum.

8. The gravimetric conveyor of claim 7 characterized by valve means to regulate the fluid pressure on said diaphragm expansion means to vary the amount of the material conveyed by said conveyor drum per unit of time.

9. A gravimetric conveyor comprising a base, a balanced frame pivotally mounted on said base, a constant speed rotary driven shaft mounted on said frame, an annular conveyor drum continuously rotated by said shaft, feeding means to supply material to the top of said rotary conveyor drum which is fed therefrom by the rotation of said conveyor drum, control means for said feeding means to increase and decrease the supply of material flowing therefrom, rotary means operated by said shaft and controlled by the oscillating movement of said balanced frame to operate said control means to decrease the flow of material on said conveyor drum overbalances said frame and increase the flow of material from said feeding means if the weight of material on said conveyor drum underbalances said frame, a fluid actuated diaphragm expansion means carried by said base and operative to apply pressure on said frame to regulate the weight of material to be continuously carried by said rotating conveyor drum, and a slide on said base to carry said diaphragm expansion means along said frame to vary the application of pressure thereon without varying the pressure in said diaphragm means with the same fluid pressure.

10. The gravimetric conveyor of claim 1 characterized in that there is a plurality of gravimetric conveyors each feeding a different ingredient to form a common mix, the balance frame of each of said gravimetric conveyors including a fluid actuated diaphragm expansion means carried on its base and operative to apply pressure on its frame to regulate the weight of material to be continuous by its rotary conveyor drum, a slide on said base to support said diaphragm expansion means to be effective along said frame and regulate the pressure to be applied to each frame independently, and means to simultaneously change the fluid pressure to all said fluid actuated diaphragm expansion means to vary the amount of material supplied without varying the proportions of the different ingredients supplied.

11. The gravimetric conveyor of claim 1 characterized in that said feeding means to supply material to the top of said rotary conveyor drum is a belt conveyor, a variable speed motor operating said belt conveyor, said rotary means operated by said shaft to decrease and increase the speed of said belt conveyor motor to vary the flow of material from said rotary conveyor.

12. The gravimetric conveyor of claim 1 characterized in that said feeding means to supply material to the top of said rotary conveyor drum is a screw feeder, a variable speed motor operating said screw feeder, said rotary means operated by said shaft to decrease and increase the speed of said screw feeder motor to vary the flow of material from said rotary conveyor.

13. The gravimetric conveyor of claim 1 characterized in that said feeding means to supply material to the top of said rotary conveyor drum is a hopper gate, a variable speed motor operating said hopper gate, said rotary wheel operated by said shaft to decrease and increase the speed of said hopper gate motor to vary the flow of material from said rotary conveyor.

14. The gravimetric conveyor of claim 1 characterized in that said feeding means to supply material to the top of said rotary conveyor drum is an iris valve, a motor operating said iris valve, said rotary means operated by said shaft to decrease and increase the opening of said iris valve to vary the flow of material from said rotary conveyor.

15. The gravimetric conveyor of claim 1 characterized in that said feeding means to supply material to the top of said rotary conveyor drum is a hopper vane feeder, a variable speed motor operating said hopper vane feeder, said rotary means operated by said shaft to decrease and increase the speed of said hopper vane feeder motor to vary the flow of material from said rotary conveyor.

16. The gravimetric conveyor of claim 2 characterized in that said control means includes spaced rotary discs mounted on spaced shafts supported by said base, and said rotary wheel on said driven shaft oscillates between the adjacent faces of said discs and engages the same depending upon the state of the under or overbalance of said frame to operate said control means.

17. The gravimetric conveyor of claim 3 characterized by a variable resistance to regulate said control means, a resistance shaft to actuate said variable resistance, and connection means between both of said rotary discs and said resistance shaft to vary said resistance accordingly.

18. The gravimetric conveyor of claim 17 characterized by a triode to control the operation of said feeding means, and a grid circuit in said triode including said variable resistance to control said triode and thus the operation of said feeding means.

19. A gravimetric feeder including a control circuit therefor comprising a base, a balanced frame pivotally mounted on said base, a constant speed rotary driven shaft mounted on said frame, an annular conveyor drum continuously rotated by said shaft, feeding means to supply material to the top of said rotary conveyor drum which is fed therefrom by the rotation of said conveyor drum, a rotary means operated by said shaft and controlled by the oscillating movement of said balance frame if the weight of material on said conveyor drum is over or under balanced, a variable resistance controlled by said rotary means, a rotary motor to operate said conveyor drum, a feeder motor to operate said feeding means, said variable resistance connected in the circuit of said feeding means to reduce the feed upon an overweight condition and to increase the feed upon an underweight condition, a relay having normally open contacts in the circuits of said rotary motor and said feeder motor, and switch means to control the opening of said relay if said drum conveyor remains over or under loaded a predetermined length of time or said variable resistance is turned to its extreme position in either direction.

References Cited in the file of this patent

UNITED STATES PATENTS

| | | |
|---|---|---|
| 1,992,716 | Paxton | Feb. 26, 1935 |
| 2,047,203 | Henson | July 14, 1936 |
| 2,100,315 | Harper | Nov. 30, 1937 |
| 2,637,434 | Harper | May 5, 1953 |
| 2,872,073 | Harper | Feb. 3, 1959 |
| 2,889,030 | Mottet | June 2, 1959 |

FOREIGN PATENTS

| | | |
|---|---|---|
| 1,191,873 | France | Oct. 22, 1959 |